United States Patent Office 2,738,828
Patented Mar. 20, 1956

2,738,828

METHOD AND ARRANGEMENT TO CARRY OUT WELDING OPERATIONS ON PLASTIC FILM WEBS

Steffen Hammer, Oslo, Norway

Application January 25, 1954, Serial No. 405,805

Claims priority, application Norway October 10, 1953

5 Claims. (Cl. 154—42)

The present invention refers to a method and an apparatus for welding of webs made of plastic film or similar material.

During the accomplishment of welding operations on plastic film webs it has always proved to be a problem to overcome the risk of breakage along the welding seam when the welding has been carried out over the entire or most of the width of the web. Such a web in fact has to be fed on with a certain tension, and the weakening of the web caused by the welding, at any rate at the moment of welding often results in breakage, which again causes stoppage and a wasteful management of the welding machinery.

It is the object of the present invention to provide a method and an arrangement whereby the above mentioned drawback is eliminated.

As already known, welding with a metal heating element cannot be executed directly on plastic film as this, on account of the plastic's adherence in half melted condition, would render the welding operation impossible. To prevent this, welding of plastic film usually is carried out by means of a metal heating element with an intermediate layer of Teflon. Usually a piece of Teflon film is then fastened at a small distance below the welding element so that the Teflon film when the welding element is being brought down against the plastic film which is going to be welded, remains situated between the web and the element during the welding. By Teflon is meant the plastic polytetrafluorethylene. After removal of the welding element the Teflon film remains in contact with the web for a short time, whereupon the Teflon film as well is raised up from the plastic web. This belated removal of the polytetrafluorethylene film after the welding operation has been finished, has for its object to procure a desired carrying off of heat after the welding operation is finished and is of the greatest importance for the attainment of a favourable result. This could formerly not be done in rotating welding machines.

The utilization of the heat conducting properties of the Teflon film after welding is finished has also been attended to in the method and the arrangement according to the invention.

To obtain a better comprehension of the invention, some arrangements for carrying out the method according to the invention are described below.

Figure 1:
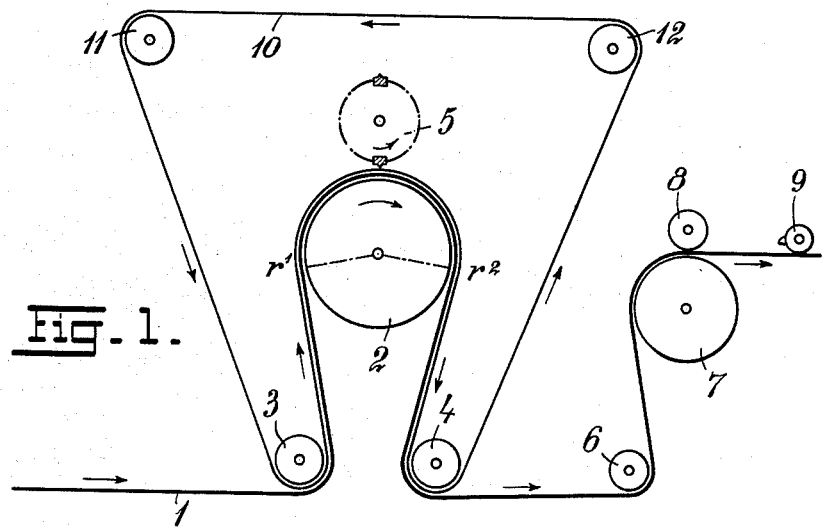

Fig. 1 shows an arrangement for producing transverse welding seams of polyethylene tubes in a bag-producing machine, by which plastic film bags are produced from a continuous tube-formed plastic film web.

The plastic web 1 is drawn from a suitable supply and leads, as shown at the bottom left of the figure, up to the supporting roller 2 over the guide roller 3. From the support roller 2 the web is again led down to the guide roller 4, being arranged parallel to the guide roller 3 and passing therefrom over the guide rollers 6 and 7, the latter cooperating with a feed roller 8, to a suitable cutting means, indicated at 9.

The roller 2 cooperates with a rotating welding arrangement indicated at 5, so that the web which passes continually over the roller 2 by the rotating welding device 5 is provided with transverse welding seams, whereby the polyethylene tube which constitutes the web through such transverse welding seams is closed to bag form.

Over the roller 2 a further web 10 made of Teflon or some similar material is running. This polytetrafluorethylene web 10 has been made endless and besides running over the roller 2 and the guide rollers 3 and 4 passes over the guide rollers 11 and 12 so that the web will run in a suitable circuit round the entire arrangement, as clearly shown on the drawing.

Through this arrangement the plastic film web 1 thus on passing over the roller 2 between the radii $r^1$ and $r^2$, i. e. on an area somewhat greater in extent than 90° of the circumference of the roller, will be lying between the polytetrafluorethylene web 10 and the roller 2. The plastic film web 1 consequently will be held or firmly fixed against the surface of the roller 2 over the area mentioned by the superposed polytetrafluorethylene web 10.

During operation the webs are moving as indicated with the arrows in Fig. 1, and the welding device 5 in a manner known per se will perform welding seams across the plastic film web, through the polytetrafluorethylene web. As the plastic web as mentioned, lies firmly pressed against a greater part of the circumference of the roller by means of the polytetrafluorethylene web, tension in the plastic web is prevented from being transferred to the welding range at the moment of welding or immediately after this. Thereby one is secured against breakage occurring, as above mentioned.

On account of the polytetrafluorethylene web being superposed upon the plastic web some time after the welding has been carried out, the desired carrying off of heat will, as explained above, be obtained.

By means of the arrangement as described according to Fig. 1, it will be possible to produce plastic film bags continually without any risk for breakage of the web at the same time as efficient welding is being warranted.

Figure 2:
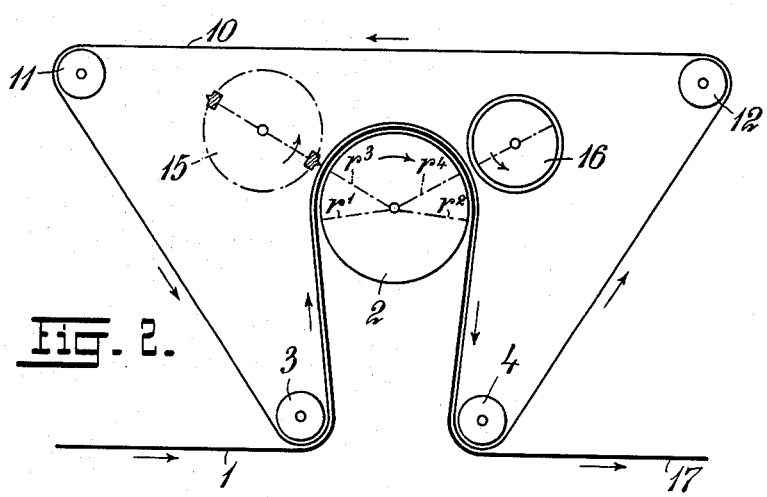

By means of the arrangement according to Fig. 2 the welding operation has also been extended to comprise longitudinal welding seams for the plastic web. Most of the elements involved in the device have been arranged in conformity with Fig. 1 and details in Figs. 2 and 1 that are similar consequently have been given the same reference numerals.

The arrangement according to Fig. 2 comprises a rotatable welding device 15 for the performance of transverse welding seams, while on the other side of the roller a welding device 16 has been provided for longitudinal welding seams. The device 16 may then advantageously be provided with circular welding ribs over the circumference, preferably with several spaced ribs, so that a plastic web for instance consisting of a wide polyethylene tube, by longitudinal welding along several welding seam lines, can be divided into several running lengths of bag blanks. The device according to Fig. 2 thus renders it possible to pass through a machine of this kind a wide web of plastic film tube, which for instance by means of four or six longitudinal welding seams carried out with the arrangement indicated with 16 after preceding transverse welding seams obtained by the arrangement indicated with 15 gives a very large number of finished plastic film bags in continual production.

I claim:

1. A method of welding continuous thermoplastic film webs to form a continuous series of bags comprising the steps of advancing a substantially tube-shaped thermoplastic film web over a drum, superimposing an endless web of heat resistant plastic over said film web whereby said film web is held firmly against said circumference of said drum, progressively sealing said web transversely as said firmly held web advances over said drum, and progressively sealing said web longitudinally as said firmly held web advances over said drum.

2. A method of welding continuous thermoplastic film webs to form a continuous series of bags, comprising the steps of advancing two superimposed thermoplastic webs over a drum, superimposing an endless web of polytetrafluorethylene over said film web thereby said webs are held firmly against said drum, progressively sealing said web transversely as said firmly held web advances over said drum, and progressively sealing said web longitudinally as said firmly held web advances over said drum.

3. A method of welding continuous thermoplastic film webs to form a continuous series of bags comprising the steps of advancing a substantially tube-shaped thermoplastic film web over a drum, said film web being disposed over the circumference of the drum in excess of 90°, superimposing an endless web of heat resistant plastic over said film web whereby said film web is held firmly against said circumference of said drum in excess of 90°, progressively sealing said web transversely as said firmly held web advances over said drum, and progressively sealing said web longitudinally as said firmly held web advances over said drum, said endless web being superimposed over said thermoplastic film web for some distance after said sealing whereby sealing heat is carried away.

4. A method of welding continuous thermoplastic film webs to form a continuous series of bags, comprising the steps of advancing two superimposed thermoplastic webs over a drum, said superimposed film webs being superimposed over the circumference of the drums in excess of 90° superimposing an endless web of heat resistant polytetrafluorethylene over said film web whereby said webs are held firmly against said circumference of said drum, progressively sealing said web transversely as said firmly held web advances over said drum, and progressively sealing said web longitudinally as said firmly held web advances over said drum, said endless web of polytetrafluorethylene being superimposed over said thermoplastic film webs for some distance whereby welding heat is carried away.

5. A rotating welding machine for plastic welds comprising guide rollers whereby an endless web of polytetrafluorethylene is brought to lay over the circumference of a supporting roller guide rollers whereby a plastic film web is brought to lay between said polytetrafluorethylene web and said supporting roller, and rotatable welding means disposed adjacent to said supporting roller, said rotatable welding means having rolling contact with said endless web, that portion of said welding means in contact with said endless belt moving in substantially the same direction as said endless belt at said point of contact.

References Cited in the file of this patent

UNITED STATES PATENTS

| | | |
|---|---|---|
| 2,206,965 | Lakso | July 9, 1940 |
| 2,556,008 | Spalding | June 5, 1951 |
| 2,579,063 | Andrews | Dec. 18, 1951 |
| 2,680,471 | Mercer | June 8, 1954 |